United States Patent [19]

Brizzolara

[11] 4,211,804
[45] Jul. 8, 1980

[54] POLYISOCYANATE COMPOSITIONS

[75] Inventor: Donald F. Brizzolara, Wilmington, Del.

[73] Assignee: E. I. Du Pont de Nemours and Company, Wilmington, Del.

[21] Appl. No.: 970,229

[22] Filed: Dec. 18, 1978

[51] Int. Cl.$^2$ ............................................... B05D 3/02
[52] U.S. Cl. ............................... 427/377; 260/453 A; 260/453 AB; 260/453 AR; 260/453 AL; 252/182; 427/385.5; 427/389.7
[58] Field of Search ..... 260/453 A, 453 AB, 453 AR, 260/453 AL; 528/58, 75; 427/385 R, 385 C, 385 A, 377; 252/182

[56] References Cited

U.S. PATENT DOCUMENTS

| | | |
|---|---|---|
| 3,471,450 | 10/1969 | Muller . |
| 3,903,126 | 9/1975 | Woerner et al. . |
| 3,928,271 | 12/1975 | Matsuda et al. . |
| 3,943,158 | 3/1976 | Dietrich et al. . |
| 3,943,159 | 3/1976 | Quiring et al. .................... 260/453 X |
| 4,018,745 | 4/1977 | Peterson ............................ 528/58 X |
| 4,038,257 | 7/1977 | Suzuki et al. .......................... 528/75 |

*Primary Examiner*—Michael R. Lusignan

[57] ABSTRACT

Moisture-cure of a polyurethane prepolymer based on an aliphatic diisocyanate is readily accomplished when a prepolymer is first made from a polyhydroxy compound and an isocyanate group-terminated adduct of the aliphatic diisocyanate with a monosecondary or disecondary diamine obtained by reaction of an aliphatic diamine with an activated monoethylenic compound. Tetravalent organotin compounds are particularly good catalysts for the moisture cure. Moisture-curable polyurethane compositions of the present invention are useful in polyurethane coatings, especially for decorative surfaces, such as flooring.

12 Claims, No Drawings

POLYISOCYANATE COMPOSITIONS

BACKGROUND OF THE INVENTION

This invention relates to aliphatic diisocyanate compositions suitable in the preparation of polyurethane elastomers, especially of polyurethane coatings that can be moisture cured.

Use of certain aliphatic diisocyanates in the preparation of polyurethane elastomers is well known. Such elastomers can be made substantially colorless and transparent and thus are particularly suitable in coatings when it is desired to protect a decorative surface, such as a flooring or stained wood. Compared with aromatic diisocyanates, aliphatic diisocyanates have a shortcoming of being less reactive, so that curing of aliphatic diisocyanate-base prepolymers with certain curing agents, such as polyols or moisture, requires impractically long times. Moisture curing is a particularly desirable technique for polyurethane coatings. Accordingly, methods for decreasing the time to tack-free condition (hereinafter, tack-free time) have been sought by the industry.

SUMMARY OF THE INVENTION

According to this invention, it has been discovered that compositions obtained by the reaction of at least two moles of an aliphatic diisocyanate with the addition product formed from one mole of a diprimary aliphatic diamine and at least one mole of an activated monoethylenic compound can be advantageously used, in lieu of the aliphatic diisocyanate itself, in preparing moisture-curable polyurethane prepolymers which have short tack-free time.

DETAILED DESCRIPTION OF THE INVENTION

The aliphatic diisocyanates suitable in the practice of this invention are any such isocyanates that have been known heretofore to be useful in making elastomeric polyurethanes. These include, for example, tetramethylene diisocyanate, hexamethylene diisocyanate, m- and p-xylylene diisocyanates, cyclohexane-1,4-diisocyanate, 3,3,5-trimethyl-5-isocyanatomethylcyclohexyl isocyanate (also known as isophorone diisocyanate), and 4,4'-methylenebis(cyclohexyl isocyanate). This lastmentioned diisocyanate is preferred because of the excellent properties of polyurethane coatings made therewith. Because it was earlier named di(p-isocyanatocyclohexyl)methane, it became known in the industry as PICM. Isophorone diisocyanate also is available in commercial quantities and is another preferred species. It is less reactive than PICM.

The addition product of a diprimary aliphatic diamine with an activated monoethylenic compound is either a monoprimary monosecondary diamine or a disecondary diamine, depending on the relative proportions of the reactants. The activated ethylenic compound is a compound having an electron-withdrawing group in an α-position to a double bond. Typical suitable activated ethylenic compound include, for example, esters of acrylic and methacrylic acids and acrylonitrile. Free acrylic and methacrylic acids are not desirable because of the possible side reactions between the acid groups and the amine groups, resulting in salt formation. Aliphatic, aromatic, araliphatic, and substituted aromatic esters of acrylic and methacrylic acids are useful in the process of this invention. The alcohol or phenol from which those esters are derived preferably has at most 12 carbon atoms. Other suitable activated monoethylenic compounds include amides of acrylic and methacrylic acids, such amides being unsubstituted, N-substituted, or N,N-di-substituted, the substituents being alkyl, aryl, alkaryl, or aralkyl groups having at most 12 carbon atoms.

The aliphatic diamine can be any commercially available material, either acyclic or cyclic, for example: tetramethylenediamine, hexamethylenediamine, m- and p-xylylenediamine, 3,3,5-trimethyl-5-aminomethylcyclohexylamine, 1,4-cyclohexanediamine, and 4,4'-methylenebis(cyclohexylamine). The last-named diamine, which is preferred, has been known for many years in the industry under the designation PACM. It has to be kept in mind that each six-membered ring present in cycloaliphatic compounds, such as isophorone diisocyanate, the corresponding diamine, PICM, and PACM, can theoretically exist in two stereoisomeric forms: cis- and trans-. The relative proportions of those stereoisomers in each such compound may influence the reactivity of the compound or the properties of polyurethanes made therewith.

The reactions of an activated ethylenic compound with a diamine can be represented schematically by the following equations 1 and 2

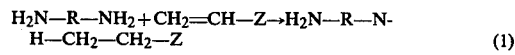

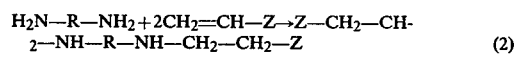

where R is a divalent aliphatic radical, and Z is an electron-withdrawing group such as, for example, carbalkoxy, nitrile, or amide.

For practical reasons, it is recommended that a disecondary diamine be prepared, as shown in equation (2) above. However, a monosecondary monoprimary diamine made according to equation (1), above, as well as mixtures of these two types of products made with less than 2 moles of activated monoethylenic compound per mole of diprimary diamine are suitable in the practice of the present invention.

Reaction of the aliphatic diisocyanate with the above addition product in stated ratios gives principally a diurea terminated by two isocyanate groups, for example, as shown below for one of the preferred cases:

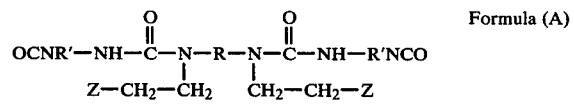

Formula (A)

where R and Z have the same meaning as above, and R' is a divalent aliphatic radical.

While the following discussion will frequently refer to the bisurea (A), it is understood that the same considerations apply to the bisurea obtained from the monoprimary monosecondary diamine adduct as well as to mixtures of both types in any proportions, the only real differences being their stoichiometric requirements.

Normally, a sufficient excess of the aliphatic diisocyanate will be used to produce a liquid product consisting principally of a solution of the bisurea of Formula (A) in the diisocyanate. Additionally, some oligomeric material and minor amounts of other products may be present in the solution.

In order for the compositions of this invention to be of practical interest, that is, to have sufficiently short tack-free time and to cure to polyurethanes having good properties, it is advisable to use solutions of the bisurea (A) in excess diisocyanate having a minimum concentration of the bisurea (A) of at least 10%. Although solutions having bisurea (A) concentrations as high as 80% have been successfully used, it is believed that a practical concentration range is about 30–60%, at least when the diisocyanate is PICM, and the diamine is an adduct of PACM with a $C_1$–$C_4$ alkyl acrylate or methacrylate.

The preferred method of preparing such solutions is by direct addition of the diamine adduct to the diisocyanate. In this way, precipitation of insoluble polyureas is avoided.

For the preparation of coatings according to the present invention, a prepolymer is first prepared from the above solution of the bisurea (A) in excess diisocyanate and a polyhydroxy compound using such proportions of the reactants that the resulting prepolymer has pendant —NCO end groups. The technique used is the same as in the preparation of conventional polyurethane prepolymers based on the same aliphatic diisocyanates, and the same kinds of polyhydroxy compounds are suitable. This information is well known to the art. Usually, the polyhydroxy compounds will be polyesters or polyethers having number average molecular weights of about 100–5000. The polyesters are made from dicarboxylic acids or their derivatives, e.g., dichlorides or diesters, and diols, triols, or polyols. Suitable dicarboxylic acids include, for example, succinic, adipic, sebacic, terephthalic, and isophthalic acids. Suitable polyols include, for example, ethylene glycol, propylene glycol, 1,4-butanediol, glycerol, trimethylolpropane, mannitol, sorbitol, polyethylene glycols, polypropylene glycols, and mixed poly(ethylene) (propylene) glycols. All these materials are available commercially. Polyethers are made by polycondensation of ethylene oxide, propylene oxide, epichlorohydrin, or other epoxides, usually with a small amount of an active hydrogen compound, such as a polyol. Glycerol, trimethylolpropane, pentaerythritol, sorbitol, ethylene glycol, propylene glycol, resorcinol, and butanediol are some of the suitable polyols for this purpose. Polyethers useful in the process of this invention are available from many commercial sources. The prepolymers are preferably prepared by adding the polyhydroxy compound to the solution of bisurea (A) in diisocyanate in appropriate ratio.

It has been found that the prepolymers made by this process can be moisture-cured in a practical manner, the tack-free time being in many cases less than one hour. The resulting cured products have very good physical properties. The moisture-cured polyurethanes are economically very attractive because they require no capital investment in special curing equipment, while permitting practically fast handling and stacking of coated articles.

Both the prepolymer formation from the bisurea (A) and a polyhydroxy compound and the moisture cure of the prepolymer are catalyzed by catalysts known to promote urethane formation. The use of catalysts in the cure step is required to achieve practical drying rates for the moisture-curable coating compositions prepared from the isocyanate compositions of this invention, but it is optional in the prepolymer preparation step. Organotin compounds in which the tin is tetravalent are catalysts of choice in the process of this invention. Representative of these catalysts are dibutyltin dilaurate, dibutyltin diacetate, dibutyltin di-2-ethylhexanoate, dibutyltin dichloride, dibutyltin sulfide, dibutyltin dilaurylmercaptide and dibenzyltin di-2-ethylhexanoate. In the case of dibutyltin dilaurate, which is perhaps the best known of this class of catalysts, amounts of about 0.01–2.0% by weight based on nonvolatiles in the prepolymer solution are recommended in the cure step. The preferred range is 0.05–1.5% by weight. Other organotin catalysts can be used in amounts which provide equivalent tin concentrations. If less than the minimum recommended amount is used, the formation of prepolymer will still be catalyzed to a sufficient degree, but moisture cure will be impractically slow. High levels of catalysts may reduce the pot-life of the coating compositions to impractically low levels. Catalysts other than tetravalent organotin compounds recognized for accelerating the reaction of isocyanates with active hydrogen-containing compounds can also be used to shorten drying time, but they have the shortcoming of markedly shortening the pot-life of the coating composition by inducing side reactions which gel the NCO-terminated prepolymer. Representative of these less preferred catalysts are tertiary amines (triethylenediamine, N-methylmorpholine), alkylated guanidines (tetramethylguanidine), stannous salts (stannous di-2-ethylhexanoate), and inorganic bases (sodium methylate).

The above catalyst concentrations can also be used in the prepolymer preparation step, but normally much lower amounts will be used, if at all, for example, less than 0.01 weight % based on the nonvolatiles.

This invention is now illustrated by the following examples of certain representative embodiments thereof, where all parts, proportions, and percentages are by weight unless otherwise indicated. A table summarizing the experimental data and results follows the examples.

The following analytical and test methods were employed in the examples.

| | |
|---|---|
| NCO Content, % by weight | ASTM D1638 |
| Tensile Strength | ASTM D412 |
| Elongation at Break | ASTM D412 |
| Tear Strength | ASTM D470 |

Films for stress-strain and tear testing were prepared by drawing a 0.254 mm (10 mil) wet film of coating composition on plate glass. The coating was allowed to dry and then conditioned for 7 days at 25° C., 50% relative humidity. The conditioned coating was removed from the glass and the required test specimens died from the resulting film.

Sward Hardness—This method is described in "Physical and Chemical Examination of Paints, Varnishes, Lacquers, Colors", Gardner and Sward, 11th ed., 1950, pages 164–166.

Pencil Hardness—A set of drawing pencils ranging in hardness from 6B to 6H was used in this test. The lead in the pencils was exposed for a distance of about 1 cm by removing only wood. The ends of the exposed pencil leads which still had their full diameter were ground flat perpendicular to the length of the pencil leads. Starting with the hardest pencil (6H), the pencils were inclined at a 45° angle to the surface of the coating and pushed into or across the film. The grade of the hardest pencil which did not cut into the film is indicated as the pencil hardness.

Sward hardness and pencil hardness were determined on films prepared by drawing a 0.076 mm (3 mil) wet film of coating composition on plate glass. The film was allowed to dry and then conditioned for 7 days at 25° C., 50% relative humidity. Testing was carried out with the film still adhered to the plate glass.

Tack-free time is the time required for a freshly drawn wet film of 0.076 mm (3 mil) thickness on plate glass to reach a non-sticky state as indicated by lightly touching a finger to the film.

Mar-free time is the time required for a freshly drawn film of 0.076 mm (3 mil) thickness to reach a state of cure such that the film is not altered in appearance when an embossed paper towel is pressed against the film for 1 minute by a 500 g weight having a circular contact area of 10 cm$^2$.

Brookfield viscosities were obtained using an LVF model viscometer of Brookfield Engineering Laboratories, Stoughton, Massachusetts.

EXAMPLE 1

A. Methyl acrylate (86 parts, 1 mole) is added dropwise at room temperature to 105 parts (0.5 mole) of rapidly stirred 4,4'-methylenebis(cyclohexylamine) containing 20% trans,trans isomer (PACM-20). The reaction mixture is heated at 80° C. for 30 minutes following the addition. The resulting addition product is N,N'-di($\beta$-carbomethoxyethyl)-4,4'-methylenebis(cyclohexylamine), i.e., bis-methyl acrylated PACM.

B. Bis-methyl acrylated PACM (286.5 parts) prepared in step A is added to 1278 parts of 4,4'-methylenebis(cyclohexyl isocyanate) containing 20% trans,trans isomer (PICM-20) stirred at 100° C. The reaction mixture is heated at 120° C. for one hour. The resulting product has an NCO content of 21.8%, a Brookfield viscosity at 25° C. of 12.0 Pa·s and is calculated to contain 43.4% of the bisurea adduct formed from 2 moles of PICM and one mole of bis-methyl acrylated PACM dissolved in excess PICM.

C. An azeotropically dried mixture of 28.5 parts of a polypropylene ether triol having a number average molecular weight of 615, 23.7 parts of a polypropylene ether triol having a number average molecular weight of 1500, and 50 parts xylene is added slowly over 2 hours to 70.5 parts of the above isocyanate solution of bisurea adduct in the presence of 0.0005 part of dibutyltin dilaurate. Following the addition, the reaction mixture is heated 2 hours at 70° C. and diluted with 50 parts $\beta$-ethoxyethyl acetate. The resulting prepolymer solution has an NCO content of 3.24% and a Brookfield viscosity at 25° C. of 2.32 Pa·s. At this low level of the dibutyltin dilaurate catalyst, this solution is not suitable as a moisture-curable composition. However, the prepolymer is fully formed even at this low catalyst level, and the free NCO content is about the same as would be present if the amount of the catalyst were increased.

A moisture-curable coating composition prepared from the above by increasing the concentration of dibutyltin dilaurate to 1% based on nonvolatiles has a tack-free time of about 0.5 hour.

D. A moisture-curable coating composition is prepared by the procedure of step C with the exception that the concentration of dibutyltin dilaurate is only 0.1% based on the weight of nonvolatiles. At this lower level of catalyst, the composition forms coatings which have a tack-free time of about 0.7 hour.

E. For control purposes, a coating composition is prepared by the procedure of step C with the exception that the 70.5 parts of the isocyanate solution of bisurea adduct prepared in step B is replaced by 47.8 parts of 4,4'-methylenebis(cyclohexyl isocyanate) containing 20% trans-trans isomer. When dibutyltin dilaurate is used at a concentration of 1% based on nonvolatiles, a composition is obtained which yields coatings having a tack-free time of about 5 hours.

EXAMPLE 2

The procedure of step A of Example 1 is repeated with the exception that the 86 parts of methyl acrylate is replaced by one of the following:
  a. 2-ethylhexyl acrylate, 184 parts
  b. 2-phenoxyethyl acrylate, 148 parts
  c. 3,6-dioxaoctyl acrylate, 188 parts
  d. methyl methacrylate, 100 parts.

The di-secondary amines resulting from the addition reactions are converted to bisurea adducts by reaction with excess PICM-20 diisocyanate by the procedure of step B of Example 1. In turn the bisurea adducts are used to prepare coating compositions by the procedure of step C of Example 1. The compositions yield coatings which have tack-free times substantially shorter than the tack-free time of about 5 hours of the control coating composition prepared in step E of Example 1.

EXAMPLE 3

The procedure of Example 1 is repeated with the exception that in step A, 4,4'-methylenebis(cyclohexylamine) containing about 20% trans-trans isomer is replaced with the diamine containing about 50% trans-trans isomer. The resulting di-secondary amine is converted to a coating composition by the procedures of Example 1, steps B and C. The compositions yield coatings having a tack-free time of about 0.5 hour.

EXAMPLE 4

The procedure of Example 1 is repeated with the exception that in step B, 4,4'-methylenebis(cyclohexyl isocyanate) containing about 20% of the trans-trans isomer is replaced with the diisocyanate containing about 70% of the trans-trans isomer. A coating composition is prepared from the resulting solution of bisurea adduct in excess diisocyanate by the procedure of step C. The composition yields coatings exhibiting a tack-free time of less than 0.5 hour.

EXAMPLE 5

To 208.8 parts of 4,4'-methylenebis(cyclohexyl isocyanate) containing about 20% trans-trans isomer is added 84.6 parts of the N,N'-di($\beta$-carbomethoxyethyl)-4,4'-methylenebis(cyclohexylamine) prepared by the technique described in Example 1, step A. The addition is performed substantially by the procedure of step B. The resulting product is a 68% solution of the bisurea adduct in excess diisocyanate. It has an NCO content of 16.6%.

The procedure of Example 1, step C, is employed to prepare a moisture-capable coating composition, except that 92.1 parts of the 68% adduct solution of this example replaces the 70.5 parts of 43.4% solution of Example 1. The resulting coating composition yields coatings having a tack-free time of about 12 minutes.

EXAMPLE 6

A. To 721.5 parts of 3,3,5-trimethyl-5-isocyanatomethylcyclohexyl isocyanate (isophorone diisocyanate) at 100° C. is added with stirring, 191 parts of the N,N'-di(β-carbomethoxyethyl)-4,4'-methylenebis(cyclohexylamine) prepared in Example 1, step A. Following the addition, the reaction mixture is stirred at 120° C. for one hour. The resulting diisocyanate solution has an NCO content of 25.4% and a Brookfield viscosity at 25° C. of 9.2 Pa·s. The solution is calculated to contain 45% of the bisurea adduct formed from two moles of isophorone diisocyanate and one mole of bis-methyl acrylated PACM.

B. The dry mixture of polyhydroxy compounds described in Example 1, step C, is added slowly over 2 hours to 60.5 parts of the above isocyanate bisurea adduct solution in the presence of 0.0005 part of dibutyltin dilaurate. The reaction mixture is heated 2 hours at 70° C. and 50 parts β-ethoxyethyl acetate are added. The resulting product has an NCO content of 3.38% and a Brookfield viscosity of 0.2 Pa·s. This composition is not suitable for moisture-curable coatings.

Moisture-curable coating compositions prepared as above, but raising the dibutyltin dilaurate level to 1% based on nonvolatiles, have tack-free time of about 3 hours.

C. A control coating composition prepared by replacing the 60.5 parts of bisurea adduct solution with 40.6 parts of unmodified isophorone diisocyanate has a tack-free time of 24 hours, which is eight times greater than that observed for the coating of this invention prepared in step B.

TABLE I

| | MOISTURE-CURABLE COATING COMPOSITIONS | | | | | |
|---|---|---|---|---|---|---|
| | | Example 1 | | | | |
| Formulation | Control | Step C | Step D | Ex. 5 | Control | Ex. 6 Step B |
| Polypropylene ether triol, mw 615 | 28.5 | 28.5 | 28.5 | 28.5 | 28.5 | 28.5 |
| Polypropylene ether triol, mw 1500 | 23.7 | 23.7 | 23.7 | 23.7 | 23.7 | 23.7 |
| Xylene | 50.0 | 50.0 | 50.0 | 50.0 | 50.0 | 50.0 |
| β-Ethoxyethyl acetate | 50.0 | 50.0 | 50.0 | 50.0 | 50.0 | 50.0 |
| PICM-20 | 47.8 | — | — | — | — | — |
| PICM-20/Bis Methyl Acrylated PACM-20 Adduct (21.8% NCO) Example 1, step b | — | 70.5 | 70.5 | — | — | — |
| PICM-20/Bis Methyl Acrylated PACM-20 Adduct (16.6% NCO) Example 5 | — | — | — | 92.1 | — | — |
| Isophorone Diisocyanate (IPDI) | — | — | — | — | 40.6 | — |
| IPDI/Bis Methyl Acrylated PACM-20 Adduct (25.4% NCO) Example 6, step a | — | — | — | — | — | 60.5 |
| Dibutyltin dilaurate, % based on nonvolatiles | 1 | 1 | 0.1 | 1 | 1 | 1 |
| % NCO | 3.66 | 3.24 | 3.24 | 2.94 | 3.81 | 3.38 |
| Viscosity Pa·s | 0.16 | 2.32 | 3.7 | 36 | 0.26 | 0.2 |

TABLE I-continued

| | MOISTURE-CURABLE COATING COMPOSITIONS | | | | | |
|---|---|---|---|---|---|---|
| | | Example 1 | | | | |
| Formulation | Control | Step C | Step D | Ex. 5 | Control | Ex. 6 Step B |
| Tack-free time, hours | 5 | 0.5 | 0.7 | 0.2 | 24 | 3 |
| Mar-free time, hours | 8–20 | 4 | — | 3 | 34+ | 8–20 |
| Hardness - Sward | 24 | 32 | 28 | 40 | 20 | 30 |
| Hardness - Pencil | 3B | HB | 4H | B | B | 3B |
| Tensile strength, MPa | 27.6 | 31.0 | — | 16.9 | 24.1 | 34.5 |
| Elongation, % | 80 | 75 | — | 23 | 90 | 110 |
| Tear strength, kN/m | 3.2 | 4.7 | — | 2.4 | 2.3 | 3.5 |

I claim:

1. A composition consisting essentially of a solution in an aliphatic diisocyanate of the reaction product of at least two moles of said aliphatic diisocyanate with the addition product formed from one mole of a diprimary aliphatic diamine and at least one mole of an activated monoethylenic compound.

2. A composition of claim 1 wherein the aliphatic diisocyanate is 4,4'-methylenebis(cyclohexyl isocyanate).

3. A composition of claim 2 wherein the aliphatic diamine is 4,4'-methylenebis(cyclohexyl amine).

4. A composition of claim 1 wherein the aliphatic diisocyanate is 3,3,5-trimethyl-5-isocyanatomethylcyclohexyl isocyanate.

5. A composition of claim 1 wherein the activated monoethylenic compound is selected from the class consisting of aliphatic, aromatic, araliphatic, and substituted aromatic esters of acrylic and methacrylic acids in which the alcohol or phenol moiety has at most 12 carbon atoms; acrylonitrile; and amides of acrylic and methacrylic acids, such amides being unsubstituted, N-substituted, or N,N-disubstituted, and the substituents being alkyl, aryl, aralkyl, or alkaryl groups having at most 12 carbon atoms.

6. A composition of claim 5 wherein the concentration of the reaction product of the diisocyanate with the addition product of the diamine with the activated monoethylenic compound in the aliphatic diisocyanate is about 10–80 weight %.

7. A composition of claim 6 wherein the concentration of the reaction product of the diisocyanate with the addition product of the diamine with the activated monoethylenic compound in the aliphatic diisocyanate is about 30–60 weight %.

8. A polyurethane prepolymer prepared by a reaction of a composition of any of the claims 1–7 and a polyhydroxy compound in such proportions that the product has pendant—NCO end groups.

9. A moisture-curable polyurethane prepolymer consisting essentially of a prepolymer of claim 8 and of a moisture cure catalyst.

10. A composition of claim 9 in which the catalyst is a tetravalent organotin compound, which is present at a concentration equivalent to about 0.01–2% by weight of dibutyltin dilaurate based on nonvolatiles.

11. A composition of claim 10 in which the concentration of the catalyst is equivalent to 0.05–1.5% by weight of dibutyltin dilaurate based on non-volatiles.

12. A method of protecting a surface by applying to the surface a coating of a composition of claim 10 and allowing the coating to moisture-cure in the air.

* * * * *